United States Patent [19]

Tsuchino

[11] Patent Number: 5,260,573
[45] Date of Patent: Nov. 9, 1993

[54] RADIOGRAPHICAL IMAGE READING APPARATUS

[75] Inventor: Hisanori Tsuchino, Tokyo, Japan

[73] Assignee: Konica Corporation, Tokyo, Japan

[21] Appl. No.: 12,625

[22] Filed: Mar. 4, 1993

Related U.S. Application Data

[63] Continuation of Ser. No. 793,619, Nov. 18, 1991, abandoned.

[30] Foreign Application Priority Data

Nov. 21, 1990 [JP] Japan .................................. 2-314195

[51] Int. Cl.⁵ ............................................. G01N 23/04
[52] U.S. Cl. .................................................. 250/584
[58] Field of Search ........................... 250/327.2, 484.1

[56] References Cited

U.S. PATENT DOCUMENTS

| | | | |
|---|---|---|---|
| 3,859,527 | 1/1975 | Luckey | 250/327.2 |
| 4,755,672 | 7/1988 | Watanabe et al. | 250/327.2 G |
| 4,860,116 | 8/1989 | Nakajima | 358/447 |

FOREIGN PATENT DOCUMENTS

| | | |
|---|---|---|
| 55-12144 | 1/1980 | Japan . |
| 59-75200 | 4/1984 | Japan . |
| 61-72091 | 4/1986 | Japan . |

*Primary Examiner*—Carolyn E. Fields
*Attorney, Agent, or Firm*—Frishauf, Holtz, Goodman & Woodward

[57] ABSTRACT

A radiographical image reader for photoelectrically reading a radiographical image of an object. The image reader comprises a radioactive ray irradiator; a radiographical image converting panel which is a radioactive ray absorbent for absorbing the radioactive ray passed through the object so that a radiographical image information is obtained; a scanner to scan the converting panel with exciting light so that the converting panel is subjected to stimulated emission; a reader to read the stimulated emission of the converting panel so that the radiographical image is obtained; a memory to store at least one of radioactive ray uneven generation information of the irradiator and sensitivity unevenness information of the converting panel; and a processor to compensate the radiographical image information according to at least one of the radioactive ray uneven generation information and the sensitivity unevenness information.

15 Claims, 5 Drawing Sheets

RADIOGRAPHICAL IMAGE READING APPARATUS

This application is a continuation of application Ser. No. 07/793,619, filed Nov. 18, 1991, now abandoned.

BACKGROUND OF THE INVENTION

The present invention relates to a radiographical image reading apparatus, and more particularly, to an image unevenness compensation technique in an apparatus for reading radiographical image information accumulated and recorded in a stimulation phosphor.

Radiographical images such as X-ray images are widely used for diagnoses for disease, and for these X-ray images, there has widely been used a so-called radiograph which is obtained by irradiating X-rays transmitted through a photographic object on a fluorescent substance layer (a fluorescent screen), thereby generating visible light, illuminating this visible light on a film employing silver salt like an ordinary photographic film, and by developing the film.

Recently, however, there has been proposed a method for reading images directly from the fluorescent substance layer without using a film coated with silver salt.

As the aforementioned method, there is a method available wherein radioactive rays transmitted through an object are caused to be absorbed in a stimulation phosphor and then the stimulation phosphor is excited by light or heat energy, and thereby, radioactive ray energy (radioactive ray image information) stored in the stimulation phosphor by means of the aforementioned absorption is caused to conduct stimulation irradiation as a fluorescence, and this stimulation irradiation light is converted photoelectrically to obtain image signals.

To be concrete, U.S. Pat. No. 3,859,527 and Japanese Patent Publication Open to Public Inspection No. 55-12144 (hereinafter referred to as Japanese Patent O.P.I. Publication) disclose a method for converting radiographical images wherein a stimulation phosphor is used and visible light or infrared ray is used as a stimulation exciting light for the stimulation phosphor. This method employs a panel for converting radiographical images which are formed by providing a stimulation phosphor layer (a stimulation layer) on a support. The stimulation phosphor layer of the converting panel is irradiated by radioactive rays transmitted through an object, thus, radioactive ray energy each corresponding to the transmission rate of radioactive rays for each portion of the object is stored in the converting panel to form a latent image therein. After that, the stimulation layer is scanned by the stimulation exciting light to cause radioactive ray energy stored in the converting panel to be emitted and converted to light, thus, the light signals are converted photoelectrically to obtain radiographical image signals.

Radiographical image signals thus obtained are usually output, as they are or after being subjected to image processing, to a silver salt photographic film or a CRT to be visualized thereon, or they are digitalized for computerized image processing.

Digitalized radiographical image signals are stored in an image storage memory such as a semiconductor storage device, a magnetic storage device, an optical disk memory, or a photomagnetic storage device. After that, they are sometimes taken out to be output to a printer or a CRT to be visualized thereon.

In an apparatus for reading radiographical image information stored and recorded in a stimulation phosphor as stated above, a plurality of radiographical image converting panels are set selectively in many cases, and radiographical images stored in each radiographical image converting panel are read. In this case, occurrence of uneven and nonuniform coating on the stimulation phosphor layer of the aforementioned radiographical image converting panel is unavoidable in the course of production thereof. Therefore, it is sometimes impossible, due to the aforementioned sensitivity unevenness, to reproduce accurately the images, which deteriorates the quality of a radiographical image and its quantitativeness.

Namely, when the radiographical image converting panel has thereon a sensitivity unevenness, a shadow which is not related to an amount of radioactive rays transmitted through an object appears on a reproduced image, resulting in deterioration of reproducibility (efficiency of diagnosis in medical field) of radiographical images. In case of plural radiographical image converting panels to be set selectively on a radiographical image reading apparatus, each of them has a different characteristic of sensitivity unevenness. Therefore, it has been difficult to reproduce radiographical images accurately corresponding to different plural patterns of sensitivity unevenness.

In addition to sensitivity unevenness of each of the aforementioned radiographical image converting panels, there also is X-ray uneven generation (uneven X-ray generation) caused by a heel-effect in an X-ray generator. Therefore, when radiographical images are stored and recorded on radiographical image converting panels using plural X-ray generators, and when the radiographical images each being photographed through each panel are read by one radiographical image reading apparatus, the radiographical image reading apparatus can not recognize X-ray uneven generation because of different pattern of X-ray uneven generation of each X-ray generator. In this case again, reproducibility of radiographical images has been deteriorated by X-ray uneven generation in the X-ray generator.

When such unevenness exists, correlation between an amount of X-rays and signal value is deviated and quantitativeness of a signal value to the transmitted amount of X-rays disappears, resulting in inconvenience in measurement of an amount of destroyed bones.

The invention has been devised in view of the aforementioned problems, and its object is to provide a radiographical image reading apparatus wherein even when there are sensitivity unevenness of radiographical image converting panel and X-ray uneven generation in an X-ray generator, the reproducibility of radiographical images is not deteriorated by such unevenness.

SUMMARY OF THE INVENTION

To accomplish the aforementioned object, the radiographical image reading apparatus of the invention is constituted as shown in FIG. 1.

Namely, in the radiographical image reading apparatus of the invention, a radiographical image converting panel wherein radiographical image information is stored and recorded when radioactive rays generated from a radioactive ray generator are absorbed in stimulation phosphor, and transmitted through an object is scanned by exciting light and thereby the radiographical image information stored and recorded in the radiographical image converting panel is subjected to stimulation irradiation, and the stimulation irradiation light thus obtained is read photoelectrically. In this case, as shown in FIG. 1, the radiographical image reading apparatus is provided with an image unevenness information storing means wherein image unevenness information which represents at least one of radioactive ray uneven generation on each of the aforementioned radioactive ray generator and sensitivity unevenness on each of the aforementioned radiographical image converting panels is stored in advance and with a radiographical image information compensation means which compensates radiographical image information read from the aforementioned radiographical image converting panel based upon relevant image unevenness information stored in the aforementioned image unevenness information storing means.

Owing to the constitution mentioned above, when there exist radioactive ray uneven generation in a radioactive ray generator and sensitivity unevenness on each radiographical image converting panel, these image unevenness information may be stored in advance for each radioactive ray generator used in combination with a radiographical image reading apparatus and for each radiographical image converting panel. After image information accumulated and stored in a radiographical image converting panel is read photoelectrically, radiographical image information is compensated based on image unevenness information corresponding to a radioactive ray generator or a radiographical image converting panel used for obtaining radiographical image information among the aforementioned image unevenness information stored in advance. Therefore, it is possible to compensate the deterioration in reproducibility of radiographical image information caused by the aforementioned radioactive ray uneven generation and sensitivity unevenness.

DETAILED DESCRIPTION OF THE INVENTION

An example of the invention will be explained as follows.

Figure 2:
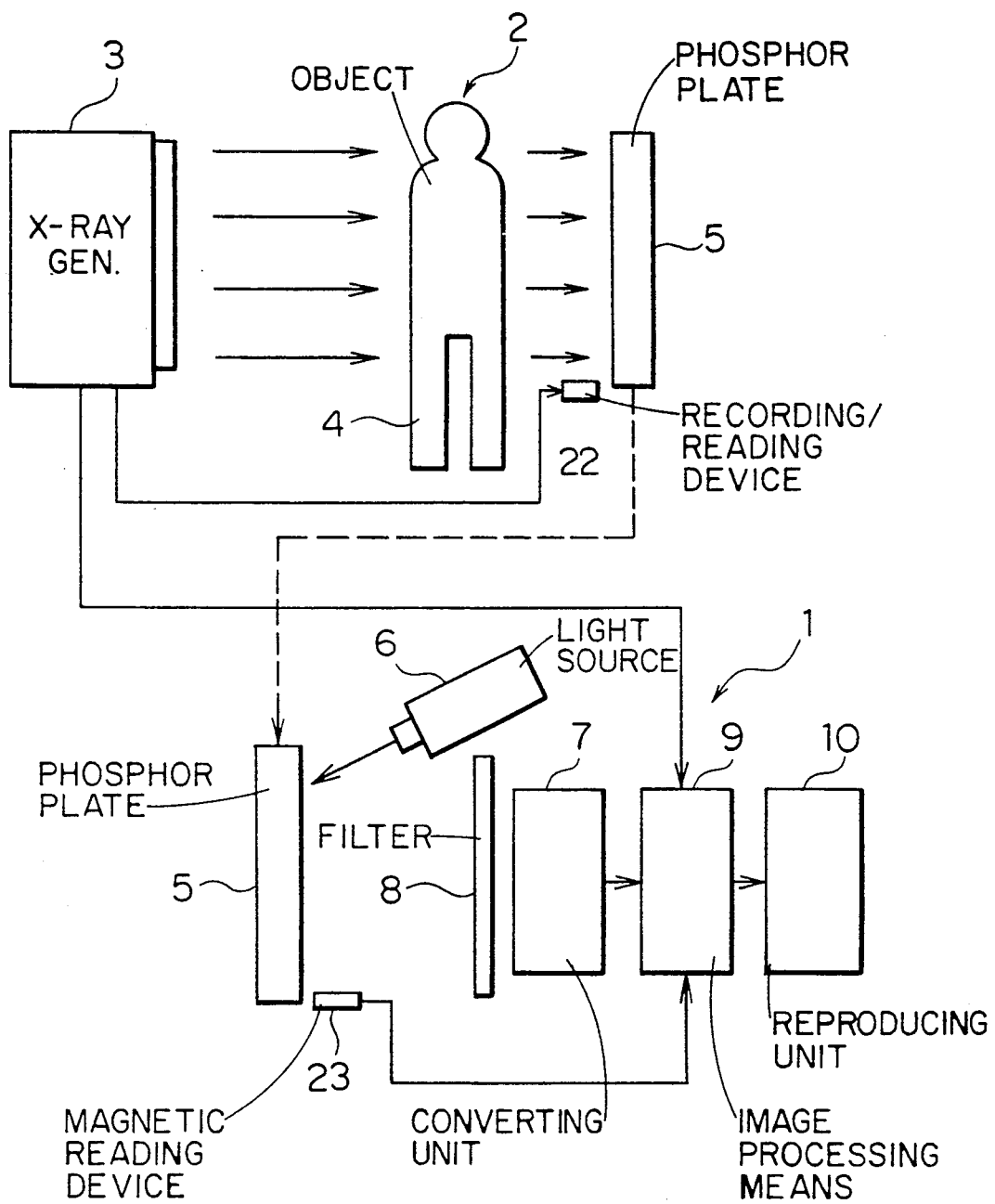
FIG. 2 is a system block diagram showing an example of the invention.

FIG. 2 showing the example represents a radiographical image information recording and reading system including a radiographical image reading apparatus related to the invention and an X-ray photographing apparatus wherein X-ray is used as radioactive ray, and it further represents an example wherein the aforementioned system is applied for radiographing human body for medical use wherein a plurality of X-ray radiographing apparatuses 2 and one radiographical image reading apparatus 1 are supposedly combined.

In X-ray radiographing apparatus 2, X-ray generator (radioactive ray generator) 3 irradiates X-rays toward an object (chest of human body, etc.) 4. Object 4 is sandwiched by X-ray generator 3 and a stimulation phosphor plate (radiographical image converting panel) 5, and the stimulation phosphor plate 5 accumulates and stores energy according to the distribution of radiation transmissivity of object 4 for the irradiated amount of radiation from X-ray generator 3 in a stimulation layer where a latent image of object 4 is formed.

With regard to the aforementioned stimulation phosphor plate 5, a stimulation layer is provided on a support of the stimulation phosphor plate 5 through the method of vapor phase accumulation of the stimulation phosphor or the method of coating of the stimulation phosphor coating solution, and the stimulation layer is shielded or covered by a protective member so that the it may not be adversely affected by ambient conditions or it may not be damaged. Materials disclosed in Japanese Patent O.P.I. Publication Nos. 61-72091 and 59-75200, for example, are used as a material for the stimulation phosphor.

On the other hand, with regard to the stimulation phosphor plate 5 on which radiographic image information of an object are accumulated and recorded is set on radiographical image reading apparatus 1 so that the radiographical image information accumulated and recorded may be photoelectrically read. For example, each stimulation phosphor plate 5 is automatically conveyed successively from each of a plurality of provided X-ray radiographing units 2 and is set on the radiographical image reading apparatus 1 one by one to be read. In this case, plural stimulation phosphor plates 5 are provided, and they are successively conveyed between the radiographical image reading apparatus 1 and each X-ray radiographing unit 2 automatically.

In the radiographical image reading apparatus 1, stimulation excitation light source (gas laser, solid laser and semi-conductor laser) 6 generates an excitation light beam whose emergence intensity is controlled, and the excitation light beam scans the stimulation phosphor plate 5 on which radiographical image information of an object is accumulated and recorded, and causes radiation energy (latent images) accumulated in the stimulation phosphor plate 5 to emerge as fluorescent light (stimulation irradiation).

Photoelectric converting unit 7 receives fluorescent light (stimulation irradiation) irradiated when the aforementioned stimulation phosphor plate 5 is scanned by excitation light beam, through filter 8 that transmits only the fluorescent light, and converts photoelectrically to current signals corresponding to incident light for each picture element, thus radiographical image information for each picture element can be obtained.

Radiographical image information read photoelectrically from the aforementioned photoelectric converting unit 7 is sent to radiographical image processing unit 9 wherein the radiographical image information obtained through photoelectric conversion is converted to digital radiographical image information by an A/D converter and is further subjected to various kinds of image processings (gradation processing, frequency processing, etc.) to be of a type suitable for diagnosis. After that, the digital radiographical information is sent to radiographical image reproducing unit 10.

The radiographical image reproducing unit 10 is a monitor such as a printer or a CRT which receives digital radiographical image information processed in the radiographical image processing unit 9 and processes the information to visualize a radiographed radiographical image as a hard copy or a reproduced image.

Incidentally, a memory device (a filing system) such as a semiconductor memory device may also be provided together with, or in place of the radiographical image reproducing unit 10.

In the above-mentioned radiographical image processing unit 9, there is provided function to compensate image unevenness that is not related to an amount of radiation transmitted through an object before image processing such as gradation processing. In the present example, the aforesaid radiographical image processing unit 9 serves also as a compensating means for radiographical image information. The above-mentioned image unevenness is caused by unevenness of an amount of X-rays generated in X-ray generator 3 of each X-ray radiographing apparatus 2, resulting in a change of an amount of radiation to which an object is exposed, and further is caused by sensitivity unevenness on stimulation phosphor plate 5, resulting in a phenomenon that an amount of energy accumulated corresponding to the same radiation varies depending on the location.

In order to compensate radiographical image information for the image unevenness mentioned above, the following structure is provided in the present example.

To be concrete, with regard to stimulation phosphor plate 5, its sensitivity unevenness is detected by measuring radiation energy accumulated on its entire light-receiving surface after irradiating radiation in the same amount on the light-receiving surface in advance (before shipment, for example), and based on the sensitivity unevenness thus obtained, compensation data with which radiographical image information is to be compensated for a picture element unit read by the aforesaid photoelectric converting unit 7 is obtained for each stimulation phosphor plate 5.

On the other hand, even for the unevenness of an amount of X-rays generated in X-ray generator 3 of X-ray radiographing apparatus 2, its characteristic is detected in advance for each X-ray generator 3, and data for compensating such unevenness of an amount of X-rays is also obtained for each X-ray generator 3 as a picture element unit read by the aforementioned photoelectric converting unit 7.

Figure 1:
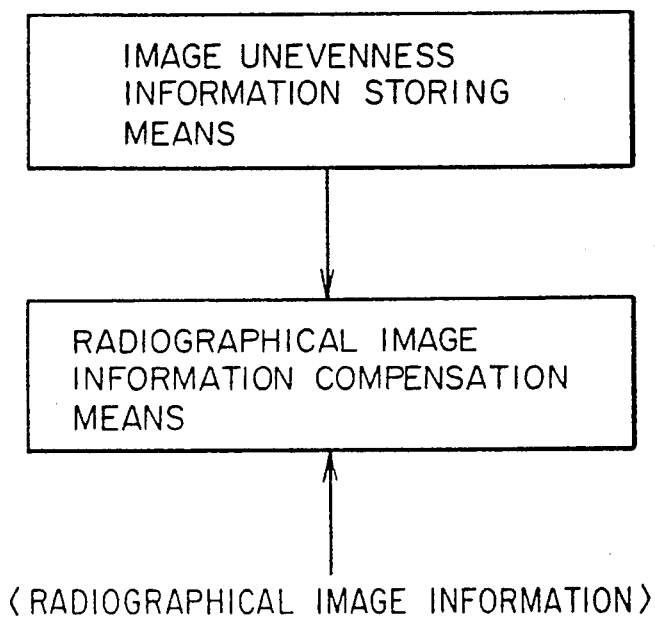
FIG. 1 is a block diagram showing the constitution of the invention.
Figure 3:
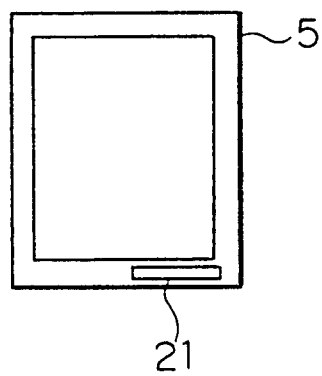
FIG. 3 is a top view showing a magnetic tape provided on stimulation phosphor plate (stimulation phosphor)

With regard to data for compensating the sensitivity unevenness for each stimulation phosphor plate 5, for example, magnetic tape 21 is arranged on the portion outside a radiographing area (a portion of a cassette frame) of each stimulation phosphor plate 5 as shown in FIG. 3, and data for compensating the sensitivity unevenness for each stimulation phosphor plate 5 is stored in the magnetic tape 21 that serves as an image unevenness information storing means.

With regard to data for compensating the unevenness of an amount of X-rays of each X-ray generator 3, they are stored in a non-volatile memory (an image unevenness information storing means) built in the aforementioned radiographical image processing unit 9 in advance.

Further, when radiographing by means of X-ray radiographing apparatus 2, an identification number (an ID number) representing X-ray generator 3 used for radiographing is written by magnetic recording/reading device 22 on the aforesaid magnetic tape 21 on stimulation phosphor plate 5, and when reading radiographical image accumulated and recorded on the stimulation phosphor plate 5 photoelectrically by means of radiographical image reading device 1, compensation data for sensitivity unevenness recorded in the aforementioned magnetic tape 21 and the identification number for the X-ray generator 3 are read by magnetic reading device 23, thus, with regard to data for compensating X-ray uneven generation of X-ray generator 3, what is corresponding to the identification number of the X-ray generator 3 read from compensation data stored in radiographical image processing unit 9 in advance is searched and obtained and thereby data for compensating finally the sensitivity unevenness of the stimulation phosphor plate 5 and data for compensating X-ray uneven generation of the X-ray generator 3 are obtained.

The radiographical image processing unit 9 compensates an amount equivalent to the image unevenness caused by sensitivity unevenness and X-ray uneven generation, by compensating radiographical image data of a picture element unit read from stimulation phosphor plate 5 based on the compensation data mentioned above, depending on two kinds of compensation data each corresponding to each picture element.

In the system wherein stimulation phosphor plate 5 and X-ray generator 3 both used in combination with radiographical image information reading apparatus 1 are limited, even when any stimulation phosphor plate 5 or any X-ray generator 3 is used, it is possible to compensate corresponding to each sensitivity unevenness and each X-ray uneven generation, and thereby to prevent deterioration of fidelity of radiographical images caused by the aforementioned sensitivity unevenness and X-ray uneven generation, resulting in improvement of diagnosing efficiency, especially in the system for medical use.

With regard to the aforesaid data for compensating sensitivity unevenness for each stimulation phosphor plate 5, it may also be stored in a non-volatile memory (image unevenness information storing means) that is built in the aforesaid radiographical image processing unit 9 in advance, corresponding to the identification number (the ID number) of the stimulation phosphor plate 5. In this case, the identification number of the stimulation phosphor plate 5 only is written on the aforesaid magnetic tape 21 of the stimulation phosphor plate 5 in advance, and when radiographing, the identification signal of X-ray radiographing apparatus 2 is written beside the identification number of the stimulation phosphor plate 5.

Based upon the foregoing, it may be taken in the radiographical image reading apparatus 1 that an identification signal of the stimulation phosphor plate 5 and an identification signal of X-ray generating device 3 both written on the magnetic tape of the stimulation phosphor plate 5 are read by magnetic reading device 23, and based on the identification signals thus read, compensation data corresponding to the stimulation phosphor plate 5 for reading radiographical images and to the X-ray generator 3 used for accumulating and recording radiographical image information on the stimulation phosphor plate 5 are searched and obtained from compensation data for sensitivity unevenness and that for X-ray generation both stored in advance, and thereby radiographical image information read are compensated for each picture element based on the compensation data obtained in the process mentioned above.

Figure 4:
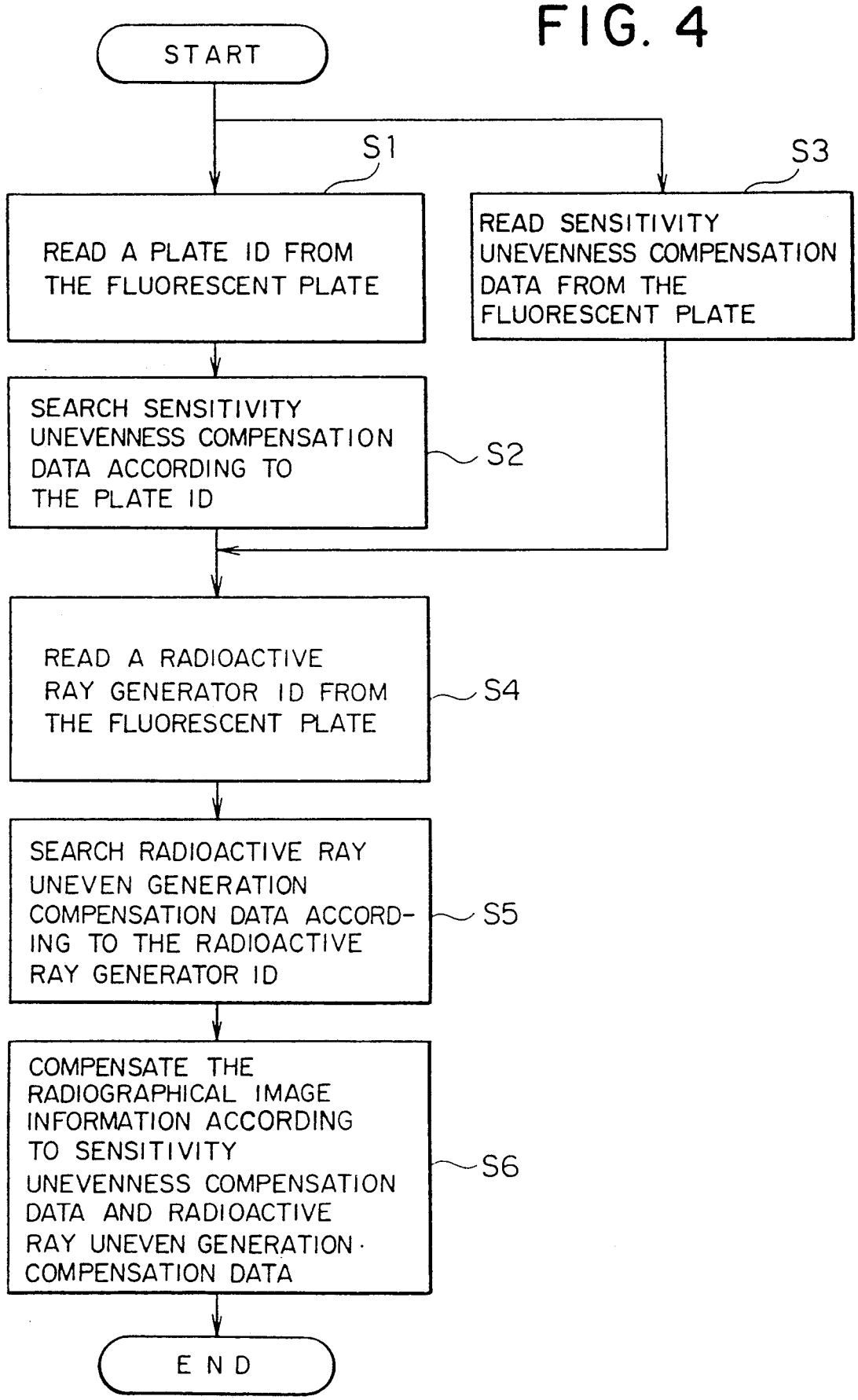
FIGS. 4 and 5 represent a flow chart showing compensation of radiographical image information in the aforementioned examples.

FIG. 4 represents a flow chart showing the behavior of compensation control for image unevenness in radiographical image processing unit 9 of radiographical image reading apparatus 1 shown in the foregoing.

In the flow chart in FIG. 4, when compensation data for sensitivity unevenness for each stimulation phosphor plate 5 is stored in the radiographical image processing unit 9 in advance, the identification number of the stimulation phosphor plate 5 (the ID number) is read by S1 from the stimulation phosphor plate 5 first, and then the compensation data for sensitivity unevenness corresponding to the identification number read by S1 is searched by the following S2.

On the other hand, when the compensation data for sensitivity unevenness of the stimulation phosphor plate 5 is stored directly in the plate 5, the compensation data may be read by S3, and an identification number for the stimulation phosphor plate 5 is not necessary in this case.

With regard to data for compensating X-ray generation of X-ray generator 3, the identification number (the ID number) of the X-ray generating device 3 used for radiographing which is written on the stimulation phosphor plate 5 is to be read by S4 first.

In the following S5, the compensation data for X-ray uneven generation corresponding to the identification number read in S4 is searched from compensation data for X-ray uneven generation stored corresponding to each X-ray generator 3 to be used.

After compensation data for each picture element for compensating sensitivity unevenness and X-ray uneven generation respectively are obtained as stated above in the foregoing process, stimulation irradiation is converted photoelectrically and radiographical image information read for each picture element are compensated for each picture element in S6 based on the compensation data. Thus, it is possible to obtain radiographical images having reproducibility with high fidelity not affected by sensitivity unevenness on stimulation phosphor plate 5 and by X-ray uneven generation in X-ray generator 3.

Incidentally, when the identification number of stimulation phosphor plate 5 is read on the side of radiographical image reading apparatus 1, bar codes may also be displayed on the fluorescent substance plate 5, in place of magnetic tape 21.

In the example mentioned above, the stimulation phosphor plate 5 used for radiographing is discriminated from the X-ray generator 3 through magnetic tape 21 provided on the stimulation phosphor plate 5. However, it is also applicable that radiographical image reading apparatus 1 and each of plural X-ray radiographing apparatuses 2 to be used are connected on an on-line basis and a set of radiographing information including the identification number of the X-ray generator 3 and the identification number of stimulation phosphor plate 5 subjected to radiographing by the use of the X-ray generator 3 is sent from the X-ray radiographing apparatus 2 to the radiographical image reading apparatus 1, as shown in FIG. 2.

In this case, the stimulation phosphor plate 5 is arranged so that the identification number of each plate may be read, the identification number of the stimulation phosphor plate 5 used for radiographing is read by magnetic recording and reading unit 22 when radiographing on X-ray radiographing apparatus 2, and the identification number of the stimulation fluorescent substance plate 5 is sent directly to radiographical image processing apparatus 9 on the radiographical image reading apparatus 1 on an on-line basis together with the identification number of the X-ray generator 3.

In the radiographical image processing apparatus 9, on the other hand, the compensation data for compensating sensitivity unevenness of the stimulation phosphor plate 5 is stored in advance corresponding to the identification number of the plate 5, and further the compensation data for compensating the X-ray uneven generation of the X-ray generator 3 is stored in the same manner as in the foregoing corresponding to the identification number of the X-ray generator 3.

In the radiographical image processing apparatus 9, there are stored radiographing information composed of identification numbers of the stimulation phosphor plate 5 and of the X-ray generator 3, and when the identification number of the stimulation phosphor plate 5 that is set is read, the X-ray generator 3 used for radiographing the stimulation phosphor plate 5 is identified, thus, the corresponding compensation data is retrieved from various compensation data for sensitivity unevenness and X-ray uneven generation stored in advance corresponding to the identification numbers, and thereby the read radiographical image information is compensated based on the retrieved compensation data.

Figure 5:
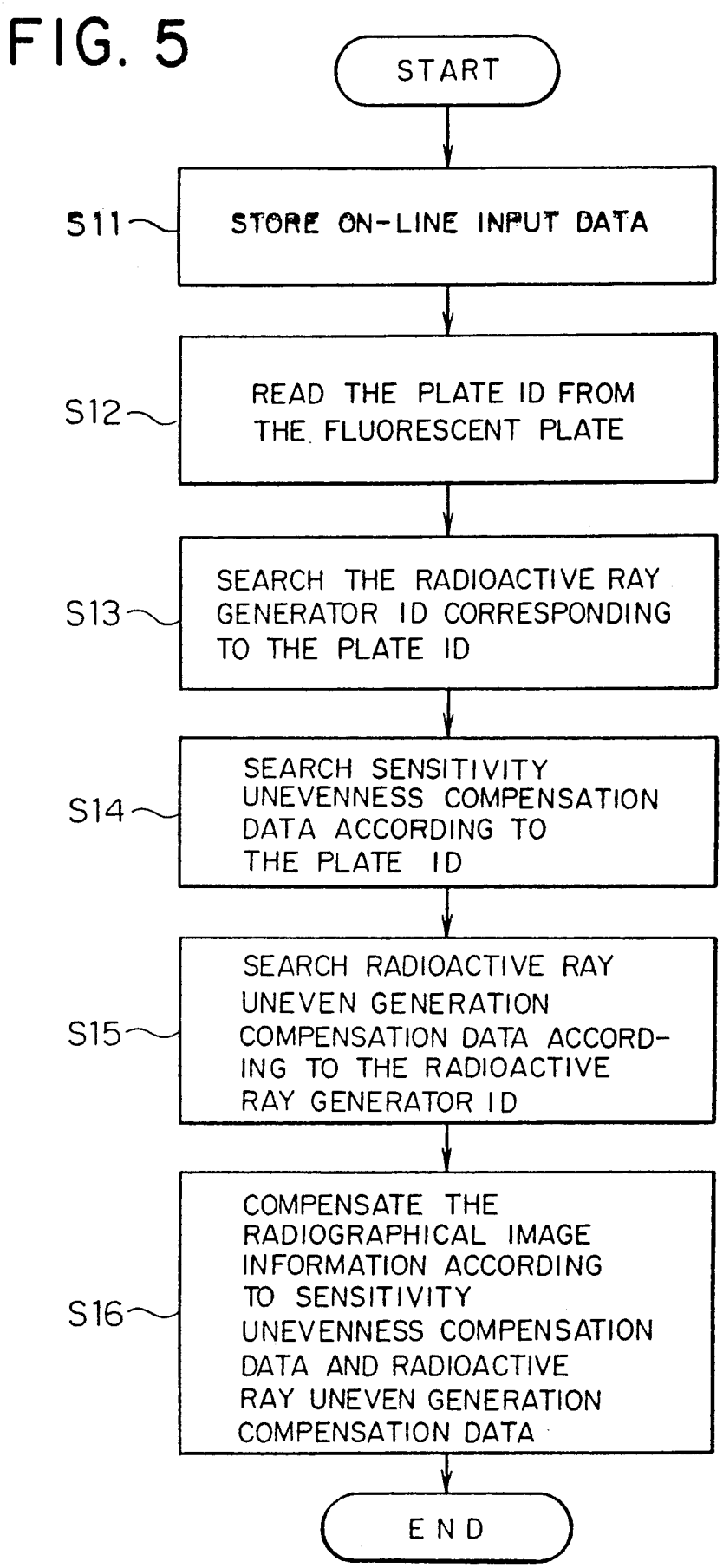

A flow chart in FIG. 5 shows how image unevenness is compensated when the on-line system is used.

First, in S11, input data sent from X-ray radiographing apparatus 2 through the on-line for each radiographing is stored. The aforementioned input data is composed of a set of the identification number of the X-ray generator 3 and the identification number of the stimulation phosphor plate 5 on which radiographical image information is accumulated and recorded by the use of the aforementioned X-ray generator 3.

In the aforesaid manner, information of the combination of the X-ray generator 3 used for radiographing and the stimulation phosphor plate 5 subjected to radiographing by the use of the aforementioned X-ray generator 3 is stored in advance, and when the stimulation phosphor plate 5 is set on the radiographical image reading apparatus 1, the identification number of the stimulation phosphor plate 5 is read in S12, and thereby the identification number of the X-ray generator 3 used for radiographing of the aforesaid set stimulation phosphor plate 5 is identified based on the aforementioned on-line information.

Through the foregoing step, both identification of the set stimulation phosphor plate 5 and identification of the X-ray generator 3 (X-ray radiographing apparatus 2) used for radiographing of the plate 5 are conducted. In the next S14, therefore, compensation data for sensitivity unevenness corresponding to the discrimination signal of the stimulation phosphor plate 5 is retrieved, and in the next S15, compensation data for X-ray uneven generation is retrieved based on the discrimination signal of the X-ray generator 2.

In the step S16, radiographical image information read from the stimulation phosphor plate 5 are compensated based on compensation data for compensating sensitivity unevenness and X-ray uneven generation respectively which are obtained respectively in the aforesaid steps S14 and S15.

Figure 6:
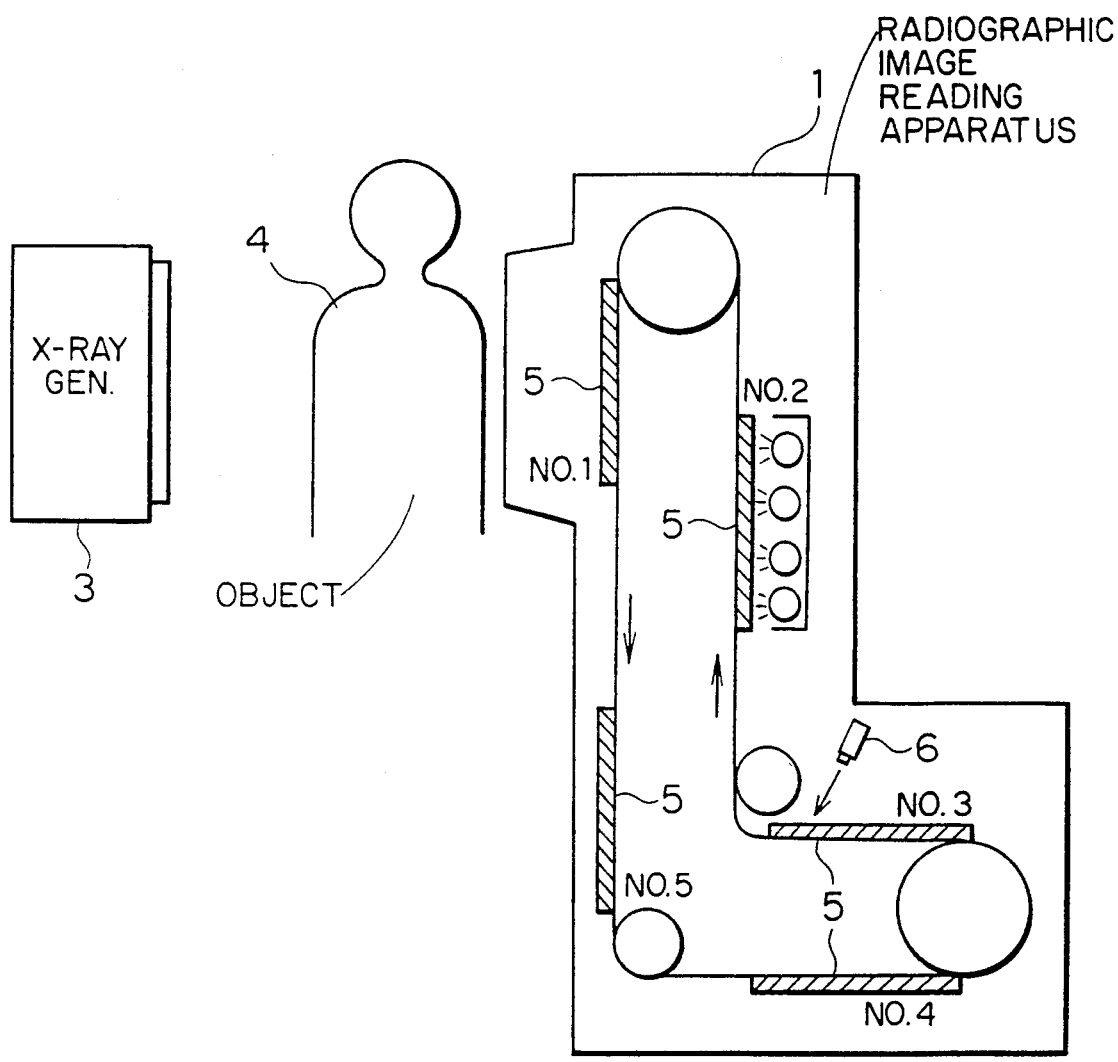
FIG. 6 is a system constitution diagram showing other example of the invention.

In this case, without being limited to the system constitution shown in FIG. 2, there may be another applicable system constitution shown in FIG. 6 wherein plural stimulation phosphor plates 5 (radiographical image conversion panels) are supported on conveyance belt 25 and are conveyed in the sequent order of a radiographing unit, a reading unit and an eliminating unit. In the system shown in FIG. 6, the sequence of the stimulation phosphor plates 5 is fixed. Therefore, it is not necessary to check the identification number of the stimulation phosphor plate 5 each time, and compensation data may be used in succession synchronizing with conveyance of the stimulation phosphor plates 5.

Incidentally, in the present example, sensitivity unevenness for each stimulation phosphor plate 5 and X-ray uneven generation of each X-ray generator 2 are compensated. However, another system for compensating only one unevenness out of two is also applicable.

Though there has been explained an apparatus employing a stimulation phosphor plate in each of the present examples, the invention does not need to be limited to those mentioned above, and an apparatus wherein photoconductive substance such as selenium is uniformly charged electrically and is exposed to X-rays so that electrical charges thereon may be read, or even an apparatus employing a semiconductor X-ray detector may also be applicable.

As stated above, a radiographical image reading apparatus of the invention, when there occurs X-ray uneven generation in an X-ray generator used when accumulating and storing radiographical image information on a radiographical image conversion panel or when there is sensitivity unevenness on the aforesaid radiographical image conversion panel, is capable of compensating the unevenness for each X-ray generator or for each radiographical image conversion panel. Therefore, it is possible to prevent that the fidelity of read radiographical image information is deteriorated by the aforesaid unevenness, which is an advantage.

What is claimed is:

1. An apparatus for photoelectrically reading a radiographic image of an object, wherein the object is irradiated with radiation beams generated by irradiating means and the radiation beams, after passing through the object are absorbed on a photostimulable phosphor plate to provide the radiographic image, comprising:

storing means including:
   first storage means for storing a plurality of beam unevenness data, each beam unevenness data being obtained by an analysis of a radiation beam of each of a plurality of irradiating means, before the radiation beams irradiate the object; and
   second storage means for storing a plurality of sensitivity unevenness data, each sensitivity unevenness data being obtained by an analysis of a sensitivity of each of a plurality of photostimulable phosphor plates before a respective one of the phosphor plates absorbs a radiation beam that has passed through the object;
   scanning means for scanning the respective one of the plurality of the phosphor plates, by stimulating the respective one of the phosphor plates with an exciting light so that the respective one of the phosphor plates emits light corresponding to the radiographic image;
   reading means for photoelectrically reading the emitted light from the scanned respective one of the phosphor plates to obtain image signals;
   identifying means for identifying both a selected one of the plurality of the irradiating means and the respective one of the phosphor plates that were actually used to provide the radiographic image corresponding to the image signals; and
   compensating means for addressing the first and second storage means so as to obtain the beam unevenness data of the identified selected one of the plurality of the irradiating means and the sensitivity unevenness data of the respective one of the phosphor plates and for compensating the image signals with the beam unevenness data and the sensitivity unevenness data obtained respectively from the first and second storage means.

2. The apparatus of claim 1, wherein each of the plurality of phosphor plates and each of the plurality of irradiating means are provided with a respective identifying number.

3. The apparatus of claim 2, wherein a respective one of the plurality of the phosphor plates is provided with a third storage means for storing the identifying number of the respective one of the plurality of phosphor plates and the identifying number of the selected one of the plurality of irradiating means that were used to provide the radiographic image provided in the respective one of the plurality of phosphor plates.

4. The apparatus of claim 3, wherein the identifying means identifies the respective one of the plurality of phosphor plates and the selected one of the plurality of irradiating means actually used to irradiate the object by the respective identifying numbers provided for the respective one of the plurality of phosphor plates and the selected one of the plurality of irradiating means.

5. The apparatus of claim 2, wherein the identifying means comprises input means for receiving the identifying number of the respective one of the plurality of phosphor plates and the identifying number of the selected one of the plurality of irradiating means actually used to irradiate the object.

6. The apparatus of claim 5, wherein the input means comprises at least one communication line connected between the identifying means and the plurality of irradiating means.

7. The apparatus of claim 2, wherein the identifying number of the respective one of the phosphor plates is provided as a bar code on the respective phosphor plate.

8. The apparatus of claim 1, further comprising:
   means for sequentially conveying the plurality of phosphor plates to the scanning means, and wherein:
   the identifying means identifies a phosphor plate from a conveying order of the plurality of phosphor plates.

9. The apparatus of claim 1, wherein:
   the second storage means is divided into a plurality of sub-second storage means; and
   a respective one of the sub-second storage means is provided on each of the plurality of the phosphor plates.

10. The apparatus of claim 9, wherein:
    each of the plurality of the irradiating means is provided with a respective identifying number; and
    the identifying number of the selected one of the irradiating means actually used to irradiate the respective one of the phosphor plates is also stored in the respective one of the sub-second storage means.

11. The apparatus of claim 10, wherein:
    the identifying means includes means for identifying the selected one of the irradiating means from the identifying number for the selected one of the irradiating means stored in the respective one of the sub-second storage means provided on the respective one of the phosphor plates;
    the plurality of phosphor plates are loaded on said scanning means; and
    the compensating means receives the sensitivity unevenness data directly from the respective one of the sub-second storage means of the respective one of the plurality of phosphor plates.

12. The apparatus of claim 1, wherein:

the first storage means is divided into a plurality of sub-first storage means; and a respective one of the sub-first storage means is provided for each of the plurality of the irradiating means.

13. The apparatus of claim 12, wherein:

the compensating means comprises a communication line connected to each of the plurality of irradiating means for receiving the beam unevenness data through the communication line.

14. The apparatus of claim 1, wherein at least one of said radiation beams provides a beam of X-rays.

15. The apparatus of claim 11, wherein the object is irradiated with a plurality of radiation beams.

* * * * *